May 15, 1923.

J. G. ROSS 1,455,225

MIRROR ATTACHMENT FOR AUTOMOBILES

Filed Sept. 17, 1921

Inventor

J. G. Ross.

By Lacey & Lacey, Attorneys

May 15, 1923.
J. G. ROSS
1,455,225
MIRROR ATTACHMENT FOR AUTOMOBILES
Filed Sept. 17, 1921    2 Sheets-Sheet 2
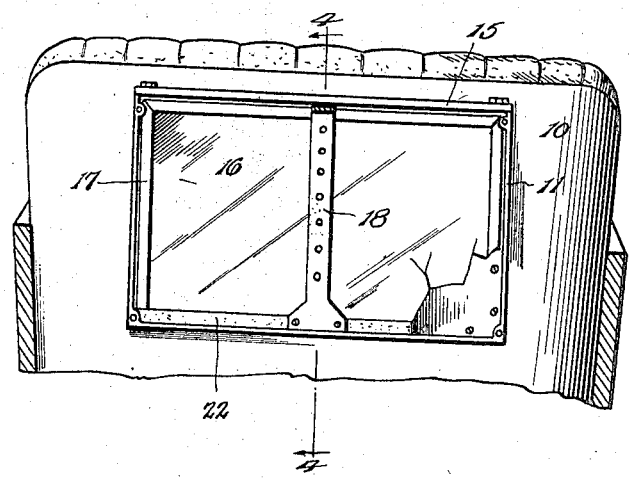
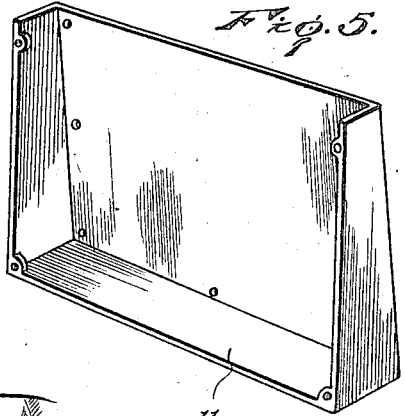
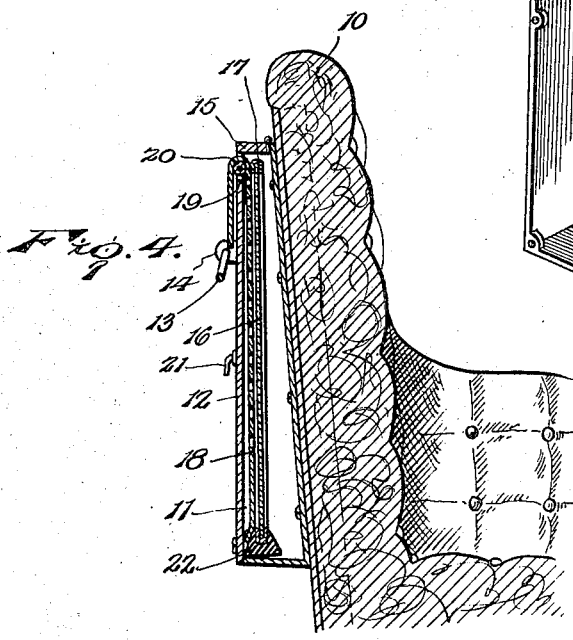
Inventor
J. G. Ross.
By Lacey & Lacey, Attorneys Patented May 15, 1923.

1,455,225

UNITED STATES PATENT OFFICE.

JAMES G. ROSS, OF SEATTLE, WASHINGTON.

MIRROR ATTACHMENT FOR AUTOMOBILES.

Application filed September 17, 1921. Serial No. 501,278.

*To all whom it may concern:*

Be it known that I, JAMES G. ROSS, citizen of the United States, residing at Seattle, in the county of King and State of Washington, have invented certain new and useful Improvements in Mirror Attachments for Automobiles, of which the following is a specification.

This invention relates to an improved mirror attachment for automobiles and has as one of its principal objects to provide a device whereby a mirror may be conveniently carried at the rear side of the front seat of a vehicle.

A further object of the invention is to provide a device wherein the mirror will normally be housed and protected within a suitable casing therefor so that the mirror will not only be kept free from dust and dirt but will also be prevented from being broken.

And the invention has as a still further object to provide a device wherein the mirror may be easily and quickly elevated to project from the casing in position for use.

Other and incidental objects will appear hereinafter.

In the drawings:

Figure 3 is an elevation showing the front wall of the casing removed.

Figure 4 is a sectional view on the line 4—4 of Figure 3, looking in the direction of the arrows, and Figure 5 is a detail perspective view showing the casing of the device, the front wall of the casing being removed.

Figure 1:
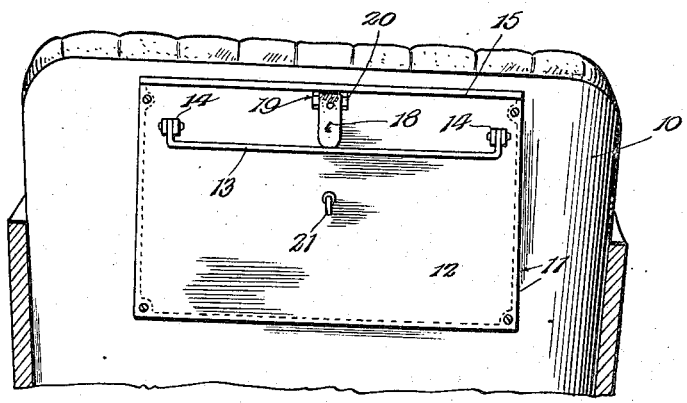
Figure 1 is an elevation showing the attachment applied to the front seat of a motor vehicle of conventional design.

As previously intimated, the mirror attachment of the present invention is particularly designed to be mounted upon the rear side of the front seat of an automobile and, in the drawings, I have accordingly so shown the device, the front seat of a conventional motor vehicle being indicated at 10. In carrying the invention into effect, I employ a casing 11 having a removable front wall 12 which is secured in position by screws or other suitable fastening devices and engaged through the back wall of the casing are appropriate fastening elements securing the casing against the rear side of the seat 10. As is usual, the rear face of the front seat is inclined and the end walls of the casing are accordingly widened toward their lower ends so that the front wall 12 of the casing will, when the device is applied, lie in a vertical position. The casing may, of course, be varied in size to suit the requirements of different vehicles but is preferably of a length to accommodate a robe rail 13. In the present instance, I have shown this rail secured by brackets 14 to the front wall 12 of the casing, the rail being pivoted upon said brackets. Hinged to the back wall of the casing at its upper edge is a lid or door 15 normally closing the casing and freely fitting within the casing is a mirror 16. This mirror is preferably mounted within an appropriate frame 17 slidably coacting at its ends with the end walls of the casing and secured to the lower rail of the frame at a point substantially midway between the ends thereof is a strap 18. Formed in the front wall 12 of the casing at its upper edge is a medial notch 19 and journaled upon said wall within this notch is a roller 20. As best shown in Figure 4, the strap is trained over this roller so that the free end of the strap normally depends from the roller exteriorly of the casing and secured to the front wall 12 below the roller is a hook or pin 21, the free end portion of the strap being provided with a series of spaced openings each adapted to receive the hook therethrough.

Figure 2:
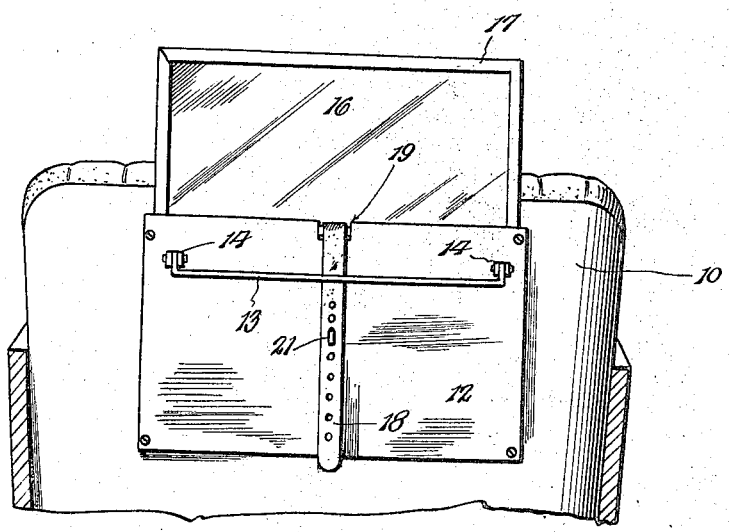
Figure 2 is an elevation showing the mirror raised in position for use.

As will now be readily understood in view of the preceding description, the free end of the strap may be grasped when, by pulling downwardly thereon, the mirror 16 will, as shown in Figure 2, be elevated to project from the casing in position for use, the mirror as it is raised operating to swing the door 15 upwardly to open position. After the mirror has been thus raised, the strap is manipulated to engage the hook 21 in one of the openings in the strap for holding the mirror elevated, it being observed in this connection that since the strap is provided with a series of openings, provision is made whereby the mirror may be adjustably held in elevated position. When the mirror is raised, the mirror will, of course, be disposed in convenient position for use. To lower the mirror it is simply necessary to disengage the strap 18 from the hook 21, when the mirror will drop by gravity back into the casing, the door 15 closing, of course, when freed by the mirror. The mirror will thus normally be protected from dust and dirt and will also be housed and thus prevented from being broken. I accordingly provide a particularly simple and convenient device for the purpose set forth and, as will now be appreciated, a device which may be readily employed in connection with motor vehicles of substantially any conventional design. Fixed to the bottom rail of the mirror frame is a wedge 22 adapted to jam in the upper end of the casing when the mirror is elevated for limiting the mirror in its upward movement as well as firmly steadying the mirror so that rattling or other movement thereof, such as would hinder use of the mirror, will be prevented.

Having thus described the invention, what is claimed as new is:

In a mirror attachment for motor vehicles, the combination of a casing gradually tapered in depth toward its upper end, a mirror normally disposed within the casing, a yieldable wedge carried by the lower edge of the mirror to engage the bottom wall of the casing for cushioning the mirror when lowered into the casing, and means for elevating the mirror to project from the casing and shifting said wedge to bind between opposing walls of the casing whereby the wedge will gradually limit the mirror in its upward movement as well as steady the mirror when elevated.

In testimony whereof I affix my signature.

JAMES G. ROSS. [L. S.]